(12) United States Patent
Pettersen

(10) Patent No.: US 8,381,504 B2
(45) Date of Patent: Feb. 26, 2013

(54) SNOOD

(75) Inventor: Kurt Pettersen, Ålesund (NO)

(73) Assignee: Morenot Dyrkorn AS, Alesund (NO)

( * ) Notice: Subject to any disclaimer, the term of this patent is extended or adjusted under 35 U.S.C. 154(b) by 0 days.

(21) Appl. No.: 13/204,887

(22) Filed: Aug. 8, 2011

(65) Prior Publication Data

US 2012/0036822 A1 Feb. 16, 2012

(30) Foreign Application Priority Data

Aug. 10, 2010 (NO) .................................. 20101132

(51) Int. Cl.
*D01H 15/00* (2006.01)
(52) U.S. Cl. ............................................. 57/22; 57/258
(58) Field of Classification Search ............... 57/22, 258; 43/44.84
See application file for complete search history.

(56) References Cited

U.S. PATENT DOCUMENTS

| 296,377 | A | * | 4/1884 | Atwood et al. ................. 57/104 |
| 330,087 | A | * | 11/1885 | Binns ............................. 474/253 |
| 2,702,983 | A | * | 3/1955 | Mische ........................... 57/202 |
| 5,062,344 | A | * | 11/1991 | Gerker ............................... 87/8 |
| 5,540,703 | A | * | 7/1996 | Barker et al. ................. 606/139 |
| 5,970,697 | A | * | 10/1999 | Jacobs et al. ...................... 57/22 |
| 2008/0022582 | A1 | * | 1/2008 | Hamano et al. .............. 43/44.98 |

* cited by examiner

*Primary Examiner* — Shaun R Hurley
(74) *Attorney, Agent, or Firm* — Wenderoth, Lind & Ponack, L.L.P.

(57) ABSTRACT

A snood is used on a line, string, or rope, such as a fishing line. The snood is formed from a stiff snood thread, the snood being twisted with two strands and having a loop for attachment to the line, string, or rope. The loop is formed by threading an end of the snood through the two strands of a main body of the snood. The snood is impregnated with a synthetic oil suitable for impregnation of fishing gear diluted in White Spirit and added color, or with a lacquer which is diluted in thinner and added color.

14 Claims, 2 Drawing Sheets

2b)

SNOOD

The invention relates to a snood for line/string/rope for use by a fishery.

BACKGROUND

A snood is a rope twisted of fibre/thread for attachment of hook to a fish line and in this context also equipped with an eye for attachment on swivel on a fish line. A fish hook is attached to one end of the snood, and in the other end the snood is attached to the fish line by the aid of a loop on the snood. Such lines may be 180-540 meters long and have up to 500 snoods with fish hooks attached to them. Typical dimensions of snoods are 18-25 inches (45-62.5 cm) long and the thickness normally varies in the region thread no. 12-24 (2.0-3.5 mm). The lines are put into the sea either manually from a coiled condition in boxes or the like, or mechanically by use of autoline equipment.

So far, the eye on such snoods has been made by simply providing a knot as shown in FIG. 1. However this knot has lead to weakening of breaking strength, large knot volume and many loose ends/tangles which may be stuck in machinery/swivels/hook in particular when hauling and launching the line.

SUMMARY OF THE INVENTION

The present invention provides a solution to the above issues.

In a first aspect the invention provides a snood for use on line/string/rope, where said snood is provided with a loop for attachment to the line/string/rope. The snood is characterized by the snood being formed by a stiff snood thread, the snood being twisted with two parts ("strands"), and where the loop is formed by an end of the snood being threaded through the two parts in a main body of the snood.

In one embodiment the end of the snood is threaded through the snood main body at least twice between the two strands by a first threading and a second threading, and where the second threading is at a distance of at least two twisted-strands from the first threading. The snood thread may be prepared from polyester or polyamide (nylon). The snood thread is laid hard. In one embodiment the snood thread may be twisted with at least 120 TPM (turns per meter), but is preferably twisted with between 150-375 TPM. The snood itself may be twisted with between 60-200 TPM.

The snood is provided with impregnation. The impregnation may be a synthetic oil suitable for impregnation of fishing tackle, such as for instance Notalin oil, diluted in White Spirit and added colour, or be lacquer which is diluted in thinner and added colour. The combination of hard twisted snood thread and the impregnation gives a particularly stiff snood, and hence the end of the snood which is threaded through the snood end part will be stuck very tight.

In a second aspect the invention provides a method for preparation of the above described snood, where the method comprises twisting of a number of single polyester/polyamide fibres together to a thread with a specific direction of rotation (S/Z) and a pre-determined number of turns per meter (TPM), twisting of a number of the thread together with opposite direction of rotation (Z/S) and pre-determined number of turns per meter (TPM) providing a snood thread, twisting of a double snood thread by twisting the snood thread in opposite direction of rotation (S/Z) and with a pre-determined number of turns per meter (TPM) in order to prepare a snood with two strands, and forming a loop by threading an end of the snood through a main body of the snood between the two strands.

The present invention provides an improved snood with a threaded eye. The threaded eye appears as the end of the snood "is threaded" back through "the main body" of the snood to make an eye. The threaded eye does not represent traditional "splicing" since the snood is made of a stiff rope built up of 2 twisted strands as opposed to regular laid rope which is built up of 3 or 4 strands.

The stiff snood and the threaded eye results in a far simpler snood with improved design without knot, and without "loose ends" or "tangles" on the end of the snood, which is much more pliant in mechanical equipment, and which is stronger with higher breaking strength for the snood, compared with the large traditional tied eye. The snood of the present invention provides a cheap and quick manufacturing process. The invention also provides a simple way of attaching the snood to a swivel eye, which saves time during repair.

SHORT DESCRIPTION OF THE DRAWINGS

Examples of embodiments of the invention will now be described with reference to the following drawings, in which:

FIG. 2b shows a blown up section of the marked region of snood from FIG. 2a which shows threading into the rope in order to make the loop in accordance with an embodiment of the invention;

DETAILED DESCRIPTION

Figure 1:
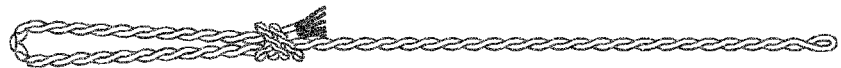
FIG. 1 shows a snood with eye made by laying a knot in accordance with prior art.
Figure 2A:
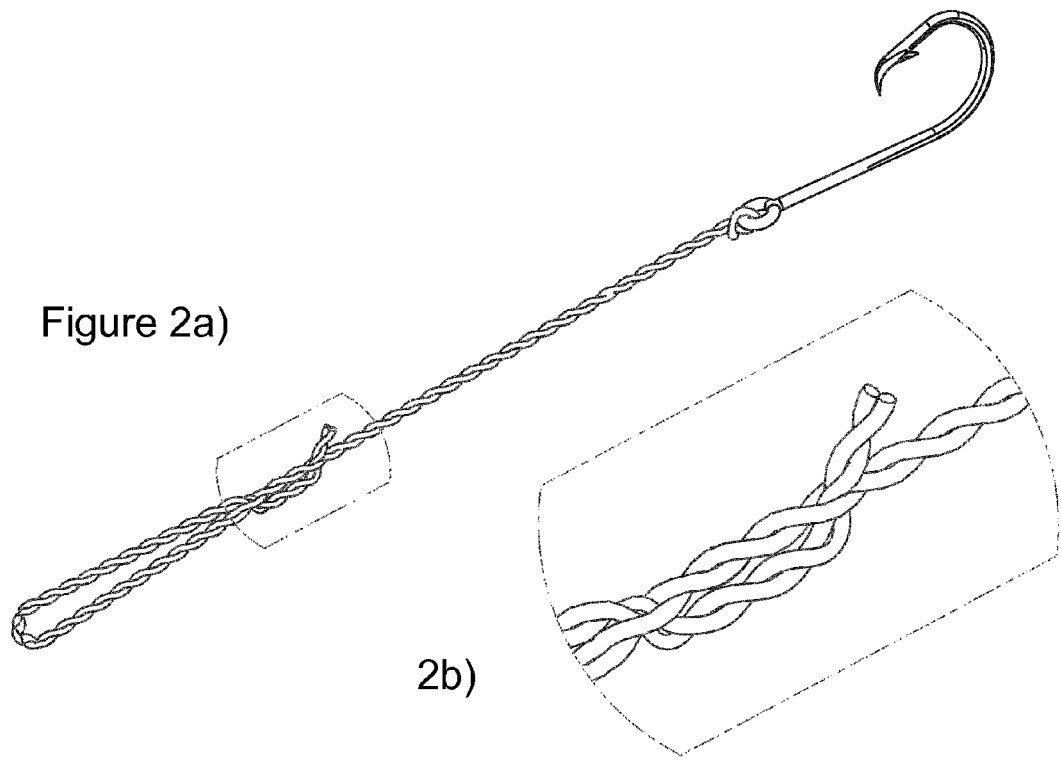
FIG. 2a shows a snood with loop in accordance with an embodiment of the invention.

FIG. 2a shows a snood with a permanent loop and with a fish hook attached in the end of the snood in accordance with an embodiment of the invention. A snood is a rope equipped with an eye and a main body. A fish hook is typically attached to the main body of the snood as shown in FIG. 2a, and an eye on the snood attaches the snood with the fish hook to a line. The snood with fish hook is for use on line/string/rope and is attached to the line with the permanent loop via a swivel eye. The permanent loop may be attached to the swivel eye by using a running knot.

The snood may in general be used for attachment of fish hooks on lines. Other types of fish hooks than the one shown in the figures may also be utilised.

The snood in accordance with the invention is stiff and prepared by the aid of hard twisting of fibre/thread. The snood is twisted with two parts ("strands"). The two parts (strands) are prepared from polyester or polyamide (nylon) fibre/thread. The stiff snood is achieved by a combination of hard twisting as explained above, and where the resulting hard laid snood is thereafter impregnated. As impregnation it is mainly used Notalin-oil diluted in White Spirit, but other impregnations may also be used. The impregnation may be a synthetic oil suitable for impregnation of fishing tackle. The impregnation may also be added colour paste with colour as desired. Optionally the snood is impregnated in thinner based lacquer, and colour paste of desired colour may be added.

The permanent loop is formed as an end of the stiff snood is threaded through the main body of the snood. The end of the rope in the embodiment in FIG. 2a is threaded through the snood main body twice by taking the end of the snood twice through the twisted parts ("the strands"). In FIG. 2a the second threading is at a distance of at least two twisted parts ("strands") from the first threading. A blown up section of threading of the end of the rope through the end part in order to make the loop on the snood is shown in FIG. 2b. The distance between the first and second insert may however be larger, for example 3, 4 or 5 parts ("strands"), and between 2-5 parts (strands) is considered beneficial. A distance of 2 parts ("strands") is preferred and gives the desired improvement in strength and pliability. Typical dimensions of snoods is a length of 18-25 inches (45-62.5 cm), while the thickness normally varies in the region thread no. 12-24 (2.0-3.5 mm). This provides a distance between the first and second insert of approximately at least 4.0 mm (from about 4.0 to about 7.0 mm) for a distance of at least 2 parts, and for 2-5 parts from about 4.0 mm to about 17.5 mm.

Examples of Embodiments

Snood may be prepared in the following way:

A number of single polyester/polyamide fibres (number of fibres/threads depends on the dimension of the finished snood) with a thickness of 1080-1670 DTEX are twisted together to a thread with a specific direction of rotation (S/Z) and a specific number of turns per meter (TPM). The thread is twisted with at least 120 TPM, but normally within an interval of 200-375 TPM. The thread may also be twisted between 150-300 TPM.

A number of these threads (depending on the dimension of the finished snood) are then twisted together with opposite direction of rotation (Z/S) and pre-determined specific TPM to a snood thread. The thread is normally twisted within an interval of 100-300 TPM depending on the dimension of the snood.

This snood thread is finally twisted double (makes the two parts ("the strands")) in opposite direction of rotation (S/Z) and with a specific TPM normally in the interval 60-200 TPM. First when this last twisting is carried out, the finished snood appears with the two characteristic parts ("the strands").

The snood is then cut to desired length.

Thereafter loops are made, and fish hooks tied on to the snood.

Snood/Rig is impregnated/dipped in desired impregnation. The impregnating liquid may be a synthetic oil suitable for impregnation of fishing tackle, such as for instance Notalin oil, and diluted in White Spirit, or lacquer diluted in thinner and added desired colour. Snood/Rig may be provided with impregnation either before or after the fish hook is tied to the snood, but normally snood is provided with impregnation at the end after the fish hook has been tied to it.

The loop is formed as an end of the snood is inserted/threaded through the snood main body between the two strands. As mentioned above, the end of the snood may be inserted through the main body at least two, but maximally five, times with a distance of at least 2 parts ("strands") between each insertion. The FIGS. 2a, 2b, 3a and 3b show an embodiment where the end of the snood is threaded twice through the snood main body. Threading of the end through the main body of the snood between the two strands may be carried out by use of a hollow needle. The end on the snood is threaded into the hollow needle and this is threaded through the parts ("the strands") in the snood the desired number of times (2-5 times) and the hollow needle/end of the snood is pulled through the parts. Since the snood is twisted hard/stiff the snood is be twisted a bit opposite to the direction the snood is twisted in order to make an opening between the two parts ("the strands") the hollow needle/the snood end is taken through. When the end of the snood is threaded through, the two parts ("the strands") are twisted back so that the opening is closed. The two strands of which the snood is made are cut with melt knife in advance so that loose ends/tangles do not occur.

FIG. 2b shows how an end of the snood twisted with to parts ("strands") is taken twice through the snood main body between the two parts of the snood ("strands"). The remaining end of the snood after threading through the snood main body for formation of the eye is desired to be minimal, but such that the end can not slide back through the snood main body. In other words, the parts of the snood squeeze over the snood end which is threaded in and prevents it from being pulled out. The number of leadthroughs/threadings (2-5 pcs) is determined from the expected load and area of utilisation. Since the snood is stiff because of said twisting and impregnation, the end of the snood which is taken through the snood main body will be stuck very tight. The end of the snood which forms the attachment for the eye, is squeezed together by the two strands in the leadthroughs themselves. The end of the snood does also not slide out and back through the leadthroughs due to the stiffness of the snood itself.

Figure 3A:
FIG. 3a shows a snood with loop in accordance with an embodiment of the invention but without an attached fish hook.
Figure 3B:
FIG. 3b shows snood with loop from FIG. 3a seen from the side.

As shown in FIGS. 3a and 3b, snood with loop, in accordance with the invention, is without "loose ends" or "tangles" on the snood end. In FIG. 3b the snood is seen from the side and it clearly appears that the attachment of the loop in accordance with the invention gives an even surface with minimal changes in the diameter of the snood. Hence, this gives a snood being much more pliant in mechanical equipment. Snood with loop in accordance with the invention leads to considerably increased breaking strength. Tests show that the new loop in average has an improvement in strength of app. 33% in relation to traditional preparation of loop with knot (the traditionally produced snood with knot on the loop is weaker because of larger material load in the knot). For the most common type of snood 16-23 (snood thread dim #16 and length=23 inches) strength tests show the following results;

Old snood, w/traditional knot=75.0 kgf.
New snood, w/new threaded loop=100.0 kgf.

The invention claimed is:

1. A snood for use on a line, string, or rope, wherein the snood is formed from a stiff snood thread, the snood being twisted with two strands,
    wherein the snood has a loop for attachment to the line, string, or rope,
    wherein the loop is formed by threading an end of the snood through the two strands of a main body of the snood,
    wherein the snood is impregnated with one of:
    (i) a synthetic oil suitable for impregnation of fishing gear diluted in White Spirit and added color; and
    (ii) lacquer which is diluted in thinner and added color.

2. The snood of claim 1, wherein the end of the snood is threaded through the snood main body at least twice between the two strands to constitute a first threading and a second threading, and
    wherein the second threading is at a distance of at least two twisted strands from the first threading.

3. The snood of claim 1, wherein the snood thread is prepared from polyester or polyamide.

4. The snood of claim 1, wherein the snood thread is twisted with at least 120 turns per meter.

5. The snood of claim 1, wherein the snood thread is twisted with between 150-375 turns per meter.

6. The snood of claim 1, wherein the snood is twisted with between 60-200 turns per meter.

7. The snood of claim 1, wherein the snood thread is prepared from nylon.

8. A method for preparing the snood of claim 1, the method comprising:
   providing a plurality of threads, each of the threads being formed by twisting a plurality of single polyester/polyamide fibres together with a first direction of rotation (S/Z) and a predetermined number of turns per meter,
   making two snood threads, each of the snood threads being formed by twisting the threads with a second direction of rotation (Z/S) and a predetermined number of turns per meter, the second direction of rotation being opposite to the first direction of rotation,
   twisting the two snood threads in the first direction of rotation (S/Z) with a predetermined number of turns per meter to form a snood with two strands, and
   forming a loop in the snood by threading an end of the snood through a main body of the snood between the two strands.

9. The method of claim 8, wherein the end of the snood is threaded through the snood main body at least twice between the two strands to constitute a first threading and a second threading, and
   wherein the second threading is at a distance of at least two twisted strands from the first threading.

10. The method of claim 8, wherein the snood thread is prepared from polyester or polyamide.

11. The method of claim 8, wherein the snood thread is twisted with at least 120 turns per meter.

12. The method of claim 8, wherein the snood thread is twisted with between 150-375 turns per meter.

13. The method of claim 8, wherein the snood is twisted with between 60-200 turns per meter.

14. The method of claim 8, wherein the snood thread is prepared from nylon.

* * * * *